April 29, 1969     E. M. TRAMMELL, JR     3,441,305
RESILIENT BUMPER STRIP
Filed Nov. 23, 1966     Sheet 1 of 2
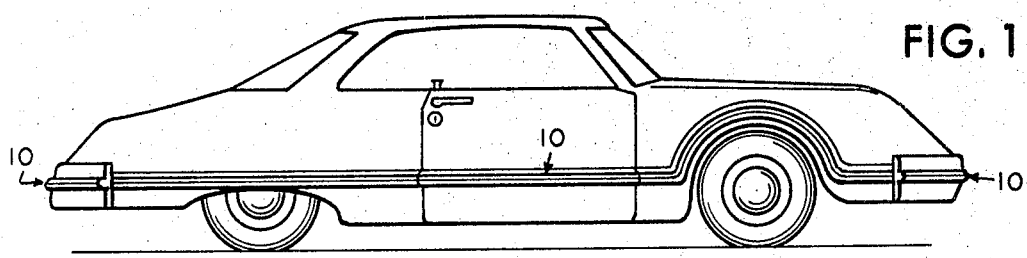
FIG. 1
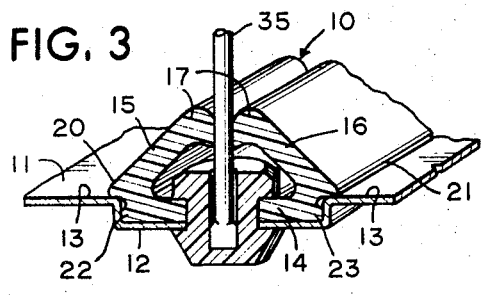
INVENTOR
EARL M. TRAMMELL JR.
BY Cohn and Powell
ATTORNEYS April 29, 1969
E. M. TRAMMELL, JR
3,441,305
RESILIENT BUMPER STRIP
Filed Nov. 23, 1966
Sheet 2 of 2
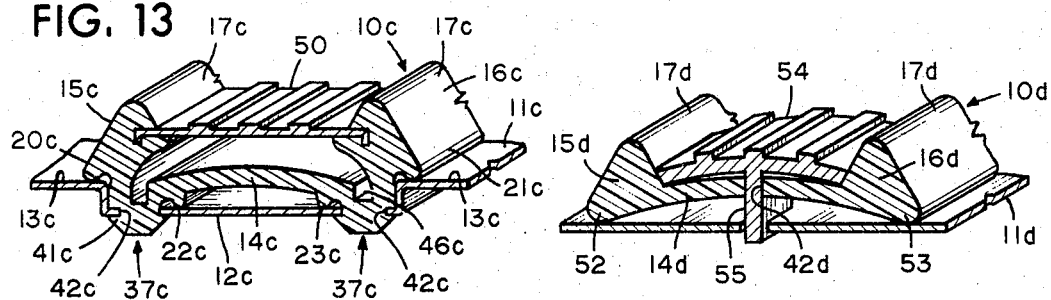
FIG. 13
FIG. 14
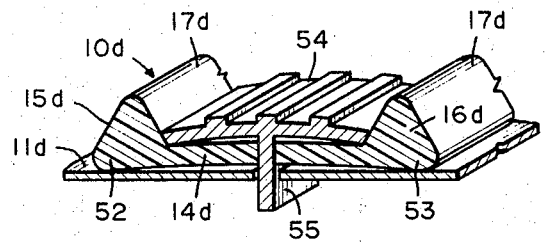
FIG. 15
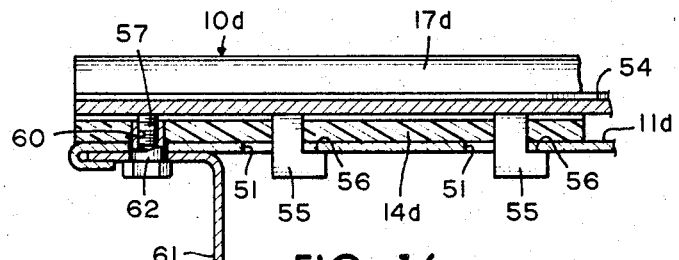
FIG. 16
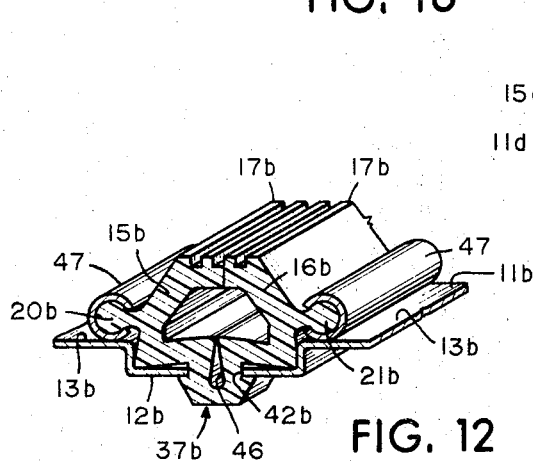
FIG. 12
INVENTOR
EARL M. TRAMMELL JR.
BY Cohn and Powell
ATTORNEYS United States Patent Office 3,441,305
Patented Apr. 29, 1969

3,441,305
RESILIENT BUMPER STRIP
Earl M. Trammell, Jr., Ladue, Mo.
(Box 435, St. Louis, Mo. 63166)
Filed Nov. 23, 1966, Ser. No. 596,622
Int. Cl. B60r 19/08, 21/14
U.S. Cl. 293—1                                        11 Claims

ABSTRACT OF THE DISCLOSURE

The bumper strip is formed of resilient material. The strip includes a base and outwardly extending side flanges. The base includes a transversely arched cushion portion, which is deformable when attached by a fastener to a support member, and is tightly clamped to the support by spring action of the arch. When used in conjunction with a support having a compatible channel depression, the clamping action is enhanced considerably.

---

This invention relates generally to improvements in a bumper strip for an automobile, and more particularly to an improved body molding adapted to protect automobile bodies and finishes from relatively minor damage.

There is an obvious and urgent need today for means to protect automobile bodies from minor damage caused by automobile doors, supermarket carts and the like when automobiles are parked at shopping centers and parking lots. Such damage now costs the motoring public millions of dollars yearly in repairs. These little dents, nicks and scrapes which a motorist can cause or get when parked is a natural consequence of today's crowded parking conditions. Because the nation's parking facilities cannot be readily changed, the remedy is to provide protective structure for the automobile body.

The present invention introduces a new and practical type of exterior automobile molding that has conventional, yet aesthetic appearance, and which is economical in cost and installation. It can be made standard on all automobiles so as to prevent this kind of damage.

The bumper strip provides functional protection from minor damage by other automobiles to the body and finish of the automobile, as well as preventing its own doors or parts protected by this molding from causing minor damage to other automobiles.

An important object is achieved by the provision of a cushioning means between the molding and the automobile body which facilitates and expedites fastening by appropriate fastening means, and further provides a clamping action of the molding to the automobile body. These features make the application of this new type of molding easier and faster on the production line.

Another important object is afforded in that the bumper strip is adapted for use in combination with a channel formed in the automobile body. Upon application of the molding, the molding is fitted tightly within the channel.

Yet another important objective is attained by the provision of an inexpensive molding that can be economically extruded. This extruded or molded bumper strip enables the incorporation and insertion of metal strips, tubing and the like within the designed channels of its structure for decorative as well as strengthening purposes. In one type of one-piece extruded molding, holes can be die cut in the molding base to permit insertion of a novel grommet fastener or other types of fasteners, for application of the molding to the automobile body. In another extruded one-piece molding, a metal extruded part would cooperate in assembly with the resilient, softer extruded bumper strip to attach the bumper strip to the automobile body.

An important object is provided by a flexible molding with a hollow, tubular structure that conceals the fastening means located inside. This hollow, tubular structure includes side flanges converging toward each other from opposite sides of a base, the resilient side flanges separating selectively to permit accessibility of tools or the like in order to install the molding. In one embodiment of the invention, the fastening means is concealed and protected by an auxiliary metal strip located between the side flanges.

Another important objective is realized by the structural arrangement of the bumper strip and the selection of material used which permits the practical use of adhesives, if needed, for greater security in attaching the molding to the automobile body. The unique construction permits end caps to be readily attached and secured, when desired, at ends of the molding by the use of adhesives.

Still another important object is to provide a bumper strip that is simple and durable in construction, economical to manufacture and assemble, efficient in operation, and which can be readily installed by anyone with little or no instruction.

The foregoing and numerous other objects and advantages of the invention will more clearly appear from the following detailed description of several preferred embodiments, particularly when considered in connection with the accompanying drawings, in which:

FIG. 1 is a side elevational view of an automobile utilizing the bumper strip along the doors and other side panels, and on the front and rear main automobile bumpers;

FIG. 2 is a fragmentary cross-sectional view illustrating a first embodiment of the bumper strip in position during installation;

FIG. 3 is a cross-sectional view of the first embodiment showing the bumper strip installed;

FIG. 4 is a bottom plan view of a resilient snap utilized in FIG. 3;

FIG. 5 is a side elevational view of the snap shown in FIGS. 3 and 4;

FIG. 6 is a perspective view of an end cap utilized on the bumper strip;

FIG. 7 is a cross-sectional view of a second embodiment of the bumper strip in its initial position prior to installation;

FIG. 8 is a cross-sectional view of the second embodiment after installation;

FIG. 9 is a fragmentary side elevational view of the second embodiment of the bumper strip shown in FIGS. 7 and 8;

FIG. 10 is a fragmentary perspective view of a tool used in the installation of the strip in FIGS. 7–9;

FIG. 11 is a cross-sectional view of a third embodiment of the bumper strip in its initial position prior to installation;

FIG. 12 is a cross-sectional view of a third embodiment after installation;

FIG. 13 is a cross-sectional view of a fourth embodiment of the bumper strip;

FIG. 14 is a cross-sectional view of a fifth embodiment of the bumper strip during installation;

FIG. 15 is a cross-sectional view of the fifth embodiment after installation; and FIG. 16 is a fragmentary side elevational view of the fifth embodiment of the bumper strip installed.

Referring now by characters of reference to the drawing, and first to FIG. 1, it will be understood that the bumper strip generally indicated at 10 can be utilized as a protective molding substantially along the length of the automobile, as for example, along the door and side panels, and along each of the front and rear main automobile bumpers.

The first embodiment of the bumper strip 10 is illustrated in FIGS. 2–5 inclusive. The bumper strip 10 is attached to a support member 11 that can be the automobile door, side panel, main bumper or the like. Preferably, the support member 11 is provided with a channel 12 at least partially defined by side shoulders 13.

The elongate bumper strip 10 is extruded of a resilient material, such as rubber, plastic or the like. The bumper strip 10 includes a base portion 14 that is arched or curved in its original condition, as illustrated in FIG. 2. Formed integrally with and extending outwardly from opposite sides of the base portion 14 are side flanges 15 and 16, the side flanges 15 and 16 converging inwardly toward each other so that their outer free ends 17 abut to form an enclosed hollow interior and to form a tubular structural member.

Formed along the length of each side flange 15 and 16 is an outwardly projecting lip 20 and 21 respectively. These lips 20 and 21 seat on the side shoulders 13 of the support member 11 upon installation of the bumper strip 10 and upon seating of the base portion 14 in the channel 12, and tend to urge the side flanges 15 and 16 resiliently toward each other to urge the free ends 17 into edge abutment.

The longitudinal side margins 22 and 23 of the base portion 14 cooperate with the fastening means to hold the bumper strip 10 in attachment with the support member 11, as will be later described in detail. It is sufficient to state at this point that when the base portion 14 is moved from the arched condition shown in FIG. 2 to the relatively flat position against the channel 12, as shown in FIG. 3, the resilient edges 22 and 23 together with the base portion 14 constituting the cushion means, are compressed. The compressive forces exerted by the cushion means cooperate with the fastening means to hold the base portion 14 in the channel 12 and to the support member 11.

As is best seen in FIG. 2, the base portion 14 of the bumper strip 10 is provided with a plurality of longitudinally spaced holes 24 that are vertically aligned with a corresponding plurality of longitudinally spaced holes 25 formed in the channel 12 of the support member 11. The fastening means includes a plurality of snaps referred to at 26 and best shown in FIGS. 4 and 5, which are selectively inserted and installed through the aligned holes 24 and 25. Each snap 26 is constructed preferably of a plastic material, and includes a head 27 and a base 30 integrally interconnected to the head 27 by a shank 31. The base 30 is provided with inwardly facing lock shoulders 32, and is split by transverse slots 33 so that the base portion 14 can be depressed inwardly and will spring resiliently outwardly.

The head 27 and shank 31 are provided with a longitudinal center opening 34 adapted to receive a manipulating tool 35, as is shown in FIG. 3.

To install the bumper strip 10 of FIGS. 2 and 3, the bumper strip 10 is first located with the base portion 14 in the channel 12 and the holes 24 and 25 vertically aligned. The base portion 14 will be initially arched as is shown in FIG. 2. The side flanges 15 and 16 are spread apart to gain access into the hollow interior and to permit the insertion of the snaps 26. Each snap 26 is inserted between the flange ends 17 and positioned over a coacting hole 24 in the base portion 14. A suitable tool 35 is located between the flange ends 17 and is located in the center opening 34 of the snap 26. Upon applying pressure to the snap 26, as through the tool 35, the snap base 30 is depressed through the aligned holes 24 and 25. Incident to full insertion of the snap 26, the base portion 14 and the longitudinal edges 22 and 23, constituting the cushioning means, are compressed between the snap head 27 and the channel 12. The resilient portions of the base 30 snap outwardly so that the lock shoulders 32 lap the underside of the channel 12, thereby anchoring the base portion 14 securely to the support member 11.

It will be understood, that upon complete attachment and positioning of the appropriate number of snaps 26, the lips 20 and 21 engaging the shoulders 13 tend to urge the side flanges 15 and 16 respectively toward each other so that their outer ends 17 are in edge abutment.

The bumper strip 10 is now positioned for usage. Upon opening the automobile door, the side flanges 15 and 16 of the bumper strip 10 will engage any object, such as the body of an adjacent parked automobile, without causing any damage. Conversely, the door of an adjacent parked automobile, when opened, will engage the side flanges 15 and 16 of the bumper strip rather than the door panel, and thereby avoid damage.

It will be understood, that under appropriate conditions, an adhesive can be applied to the underside of the base portion 14 of the bumper strip 10 to secure the base portion 14 to the channel 12. This adhesive can be used in lieu of or in conjunction with the snaps 26.

The ends of the bumper strip 10 can be closed by end caps 36, as is best illustrated in FIG. 6. Each end cap 36 is shaped to conform to the configuration of the bumper strip 10 and can be secured in place by a suitable adhesive.

A second embodiment of the bumper strip 10 is illustrated in FIGS. 7–9 inclusive. In view of the fact that the constructions of the various embodiments are similar, identical reference numerals will be utilized to designate corresponding parts wherever possible but will use the suffix letter *a*.

As for example, the bumper strip 10*a* of FIGS. 7–9 inclusive includes a base portion 14*a* and outwardly extending side flanges 15*a* and 16*a* extending inwardly toward each other so that their outer ends 17*a* abut to form a hollow interior. The base portion 14*a* includes integral, depending side edges 22*a* and 23*a* that provide an arch for the base portion 14*a* in its initial condition shown in FIG. 7 and which constitute, together with the base portion 14*a*, a cushion means. Formed longitudinally along the length of each side flange 15*a* and 16*a*, and formed integrally substantially at the base of the side flanges 15*a* and 16*a*, are outwardly projecting lips 20*a* and 21*a* respectively.

The fastening means in this second embodiment is provided by a snap generally indicated by 37 formed integral with and depending from the base portion 14*a*. The snap 37 includes a base 40 having inwardly facing lock shoulders 41.

The bumper strip 10*a* is extruded of a resilient material, such as rubber, plastic or the like, in elongate strips as suggested by FIG. 9. It will be understood that that portion of the bumper strip forming the fastening means is a continuous extrusion, also, but is cut away after such extrusion to form individual, spaced resilient snaps 37.

The support member 11*a* to which the bumper strip 10*a* is secured, includes a channel 12*a* at least partially defined by laterally spaced side shoulders 13*a*. As is best seen in FIG. 8, the channel 12*a* is provided with a plurality of longitudinally spaced, substantially rectangularly-shaped holes 42 that are adapted to conform to and receive the snaps 37.

To install the bumper strip 10*a*, the base portion 14*a* is placed into the channel 12*a* with the snaps 37 aligned with the channel holes 42. Then, the side flanges 15*a* and 16*a* are spread apart to enable the insertion and application of a suitable tool, generally indicated by 43 in FIG. 10, into the hollow interior of the bumper strip 10*a* and on top of the snap 37. Upon exerting a force on the tool 43, the base 40 of the snap 37 is forced through the channel hole 42. Upon complete insertion, the lock shoulders 41 bear against the underside of the channel 12*a*. Incident to insertion, the base portion 14*a* and the side edges 22*a* and 23a, are resiliently compressed so that the compressive force of such resilient material urges the lock shoulders 41 tightly against the channel 12a, and thereby securely fasten the bumper strip 10a to support member 11a. The resilient lips 20a and 21a are urged against the side shoulders 13a. The lips 20a and 21a tend to urge the side flanges 15a and 16a toward each other and to hold the outer ends 17a into abutment.

An elongate metal strip 44 is slidably received and retained in a compatible groove 45 formed longitudinally along the outer face of each side flange 15a and 16a. The metal strip 44 constitutes a reinforcing that effectively and operatively interconnects the lip 20a or 21a with the outer end 17a of the respective side flanges 15a and 16a. The reinforcing metal strip 44 acts to hold the associated lip 20a or 21a tightly against its coacting side shoulder 13a, and acts to urge the associated flange end 17a against the abutting flange end 17a. In addition, the metal strip 44 provides an ornamental or decorative feature to the bumper strip 10a.

A third embodiment of the bumper strip is illustrated in FIGS. 11 and 12. Again, the structure of this bumper strip is similar to those embodiments previously described and identical reference numerals will be utilized wherever possible to designate corresponding parts, but use the suffix letter b.

The bumper strip 10b of the third embodiment illustrated in FIGS. 11 and 12 includes a base portion 14b and integral, outwardly projecting side flanges 15b and 16b. The base portion 14b includes integral, depending side edges 22b and 23b, constituting cushion means. The side flanges 15b and 16b converge toward each other so that their outer free ends 17b are in edgewise abutment. The outer ends 17b are provided with a series of ribs and grooves to provide a relief, the purpose of which is to essentially hide or camouflage the edge abutment between the flange ends 17b.

Furthermore, outwardly projecting lips 20b and 21b are formed integrally along the side flanges 15b and 16b respectively.

The fastening means for this third embodiment includes a plurality of integral snaps 37b depending from the base portion 14b, each snap 37b including an inwardly facing lock shoulder 41b. A recess 46 is formed depthwise through the base portion 14b and partially through the plurality of snaps 37b, the recess 46 communicating with the hollow interior of the bumper strip 10b. The recess 46 accommodates the insertion of a fastening tool (not shown), but which may be similar to those tools 35 and 43 utilized with the previously described embodiments. In addition, the recess 46 facilitates the insertion of the snap 37b and the resilient compression of the base portion 14b and the side edges 22b and 23b constituting the cushion means.

The bumper strip 10b is utilized in conjunction with a support member 11b in which a channel 12b is formed, the channel 12b being partially defined by side shoulders 13b.

It will be understood that the outwardly projecting lips 20b and 21b have an arcuate configuration. Slidably received over and retained by each of the lips 20b and 21b is a substantially C-shaped metal strip 47, the purpose and function of which will be later described in detail.

To install the bumper strip 10b, the base portion 14b is inserted into the channel 12b. Then, the side flanges 15b and 16b are spread apart to enable the insertion of a suitable tool, which may be of the general type disclosed previously, into the recess 46 of each of the snaps 37b. Upon applying a downward force on the tool, the snaps 37b are pushed through the coacting holes 42b formed in the bottom of the channel 12b. When completely installed, the lock shoulders 41b of the snaps 37b engage the underside of the channel 12b. During such installation, the base portion 14b including the edges 22b and 23b is resiliently compressed by reducing the extent of its arch. The compressive force exerted by the base portion 14b and by the depending edges 22b and 23b holds the snaps 37b tightly in engagement and secures the bumper strip 10b positively to the support member 11b.

The lips 20b and 21b, acting through their attached metal strips 47, engage the shoulders 13b and tend to urge the side flanges 15b and 16b toward each other to hold the flange ends 17b in abutment to form a tubular structural member. The metal strips 47 act as a reinforcing for the lips 20b and 21b in exerting this force to their associated side flanges 15b and 16b respectively, and provide an ornamental and decorative feature.

It will be understood that the snaps 37b in the third embodiment shown in FIGS. 11 and 12 are formed integrally in a continuous extruded strip as described previously with respect to the second embodiment of FIG. 9, the said strip being subsequently cut away to provide the individual, longitudinally spaced snaps 37b.

The fourth embodiment of the bumper strip is illustrated in FIG. 13. Because the component parts of the fourth embodiment are similar to the bumper strips previously described, identical reference numerals will be utilized wherever possible to designate corresponding parts, but will use a different suffix letter c.

For example, the support member 11c to which the bumper strip 10c is attached includes a channel 12c at least partially defined by side shoulders 13c. Formed along opposite sides of the channel 12c are a plurality of longitudinally spaced snap holes 42c.

The bumper strip 10c includes a base portion 14c having an arched configuration and having integral, longitudinally disposed and depending side edges 22c and 23c, constituting cushion means. Extending outwardly from opposite sides of the base portion 14c are a pair of side flanges 15c and 16c, the side flanges 15c and 16c having outer ends 17c held in laterally spaced relation. Formed integrally with and extending longitudinally along the side flanges 15c and 16c are outwardly projecting lips 20c and 21c.

The fastening means includes a plurality of integral, longitudinally spaced snaps 37c at each side of the base portion 14c. Each snap 37c includes an inwardly facing lock shoulder 41c. Formed in the base portion 14c and partially in the snaps 37c at each side of the bumper strip 10c is an elongate, longitudinal recess 46c that communicates with the interior of bumper strip 10c between the side flanges 15c and 16c, and facilitates the installation of the snaps 37c.

It will be understood, that the snaps 37c in this fourth embodiment are formed as an integral continuous strip at each side of the base portion 14c as the bumper strip 10c is longitudinally extruded in much the same manner as the single row of snaps 37 in the second embodiment previously described and illustrated in FIG. 9. The continuous lengths are subsequently cut away to provide the individual, longitudinally spaced snaps 37c.

To install the bumper strip 10c, the bumper portion 14c is located in the channel 12c with the snaps 37c aligned vertically with the holes 42c. Then, a suitable tool of the general type previously described is inserted between the side flanges 15c and 16c and into the recesses 46c over the individual snaps 37c. Upon application of a downward force on such suitable tool, the snaps 37c are pushed through the holes 42c. When fully inserted, the lock shoulders 41c of the snaps 37c engage the underside of the channel 12c. During such installation, the resilient base portion 14c and the depending side edges 22c and 23c are resiliently compressed so that the compressive forces tend to hold the snaps 37c tightly in place and securely fasten the bumper strip 10c to the support member 11c. The outwardly projecting lips 20c and 21c engage the shoulders 13c under the compressive and resilient loading and tend to urge the side flanges 15c and 16c toward each other.

A metal strip 50 is slidably located between and is held by the side flanges 15c and 16c, the metal strip 50 constituting a closure to provide a hollow interior and to provide a tubular structural member. Because the sides of the metal strip 50 are provided with outwardly turned lips, the metal strip 50 is held in place and the side flanges are precluded from spreading unintentionally. The metal strip 50 constitutes a reinforcing for and between the side flanges 15c and 16c, and provides an ornamental decorative feature.

A fifth embodiment of the bumper strip is illustrated in FIGS. 14 and 15. In view of certain similarities between the structure of this fifth embodiment and the other embodiments previously described, identical reference numerals will be utilized wherever possible to designate corresponding parts. However, a different suffix letter d will be used.

For example, the support member 11d is relatively flat and is provided with a plurality of longitudinally spaced slots or holes 51.

The bumper strip 10d includes a base portion 14d that is initially arched as shown in FIG. 14, and which includes side edges 52 and 53 adapted to seat on the support member 11d. These side edges 52 and 53 constitute a cushion means and therefore take the place of the side edges 22 and 23 respectively in the other embodiments. In addition, the side edges 22 and 23 engage the support member 11d to take the place of the outwardly projecting lips 20 and 21 of the previously described embodiments. The bumper strip 10d includes outwardly extending side flanges 15d and 16d formed integrally with the base portion 14d and terminating in free ends 17d.

The fastening means includes an elongate metal strip 54 located between and engaging the opposed inner faces of the side flanges 15d and 16d, and overlying the base portion 14d. Formed integrally with and depending from the metal strip 54 are a plurality of substantially L-shaped snaps 55 arranged in longitudinally spaced relation and extending through coacting holes 42d formed in the base portion 14d. The elongate strip 54 can be formed of a material other than metal, and is preferably formed of a material that is more rigid than the material comprising the body of the bumper strip 10d.

To install the bumper strip 10d, the metal strip 54 is located between the side flanges 15d and 16d and the snaps 55 are extended through the coacting holes 42d of the base portion 14d. Then, the bumper strip 10d is located over the support member 11d as is illustrated in FIG. 14 with the snaps 55 aligned with the holes 51. As the metal strip 54 is depressed, the base portion 14d and the side edges 52 and 53 are resiliently compressed to flatten the arch as is shown in FIG. 15, thereby inserting the snaps 55 through the holes 51. When completely inserted, the bumper strip 10d, together with the metal strip 54, is shifted longitudinally to bring the snaps 55 underneath the support member 11d, as is clearly illustrated in FIG. 16. The compressive loading of the resilient base portion 14d and the resilient side edges 52 and 53 tends to hold the lock shoulders 56 of the snaps 55 securely against the underside of the support member 11d, and affixes the bumper strip 10d to the support member 11d.

When installed, the resilient side edges 52 and 53, engaging the support member 11d, tend to urge the side flanges 15d and 16d toward each other, and thereby grip the metal strip 54 therebetween.

To complete the installation of the bumper strip 10d, and to hold the snaps 55 in the longitudinally shifted position relative to the support member 11d, an auxiliary fastening mechanism is utilized. This auxiliary mechanism includes a depending arm 57 formed integrally with the metal strip 54, the arm 57 being provided with threads 60. The support member 11d is attached to a bracket 61 by a bolt sleeve 62, the bolt sleeve 62 threadedly receiving the depending arm 57.

Although the invention has been described by making detailed reference to several preferred embodiments, such detail is to be understood in an instructive, rather than in any restrictive sense, many variants being possible within the claims hereunto appended.

I claim as my invention:

1. A bumper strip for an automobile, comprising:
    (a) a support member,
    (b) an elongate strip of resilient material having a base portion and having side flanges extending outwardly from the sides of the base portion,
    (c) the base portion including a deformable transversely arched cushion means compressibly and resiliently engaging the support member, and
    (d) fastening means operatively deforming the arched cushion means to secure the strip to the support member.

2. A bumper strip for an automobile as defined in claim 1, in which:
    (e) the strip includes lips on opposite sides of the base portion and substantially at the base of the side flanges, the lips engaging the support member and, cooperating with the support member, tending to urge the side flanges toward each other.

3. A bumper strip for an automobile as defined in claim 2, in which:
    (f) an elongate metal strip of substantially C-shaped cross-section is carried by each lip and bears against the support member.

4. A bumper strip for an automobile as defined in claim 2, in which:
    (f) the side flanges are provided with inwardly facing grooves, and
    (g) a rigid strip is slidably received in the grooves and extends between the side flanges, the said rigid strip having outwardly turned lips engageable with the side flanges to preclude spreading of the side flanges.

5. A bumper strip for an automobile as defined in claim 2, in which:
    (f) a rigid strip is located between and extends substantially between the side flanges, the strip overlying the base portion, and
    (g) the fastening means is carried by the rigid strip and depends through the base portion for connection to the support member.

6. A bumper strip for an automobile as defined in claim 1, in which:
    (e) the side flanges are flexible and converge toward each other over the base portion to provide a hollow interior, and
    (f) the fastening means are carried by the base portion between the flexible side flanges and are accessible in the hollow interior for attachment to the support member, the fastening means operatively deflecting the side flanges toward each other.

7. A bumper strip for an automobile as defined in claim 6, in which:
    (g) the converging side flanges have compressively abutting free ends to provide a resilient and compressible tubular structural member, and
    (h) the side flanges are resiliently spreadable to gain access to the hollow interior for attaching the fastening means to the support member.

8. A bumper strip for an automobile as defined in claim 6, in which:
    (g) the support member is provided with an elongate channel partially defined by lateral shoulders,
    (h) the base portion of the strip is located in the channel,
    (i) the fastening means attach the base portion to the support member at the bottom of the channel, and
    (j) the cushion means includes longitudinal side margins which compressively engage the lateral shoulders, the lips tending to urge the side flanges toward each other when the fastening means are operatively attached to the support member.

9. A bumper strip for an automobile as defined in claim 6, in which:
(g) the support member is provided with a plurality of holes,
(h) the base portion is provided with a plurality of holes aligned with the support member holes,
(i) the fastening means are snaps inserted through the aligned holes, the snaps having spaced shoulders holding the base portion and support member therebetween, the base portion being transversely compressed by the snaps from arch action, and
(j) the side flanges cover the snaps, yet are resiliently spreadable to enable the insertion of the snaps.

10. A bumper strip for an automobile as defined in claim 6, in which:
(g) the support member is provided with a plurality of holes,
(h) the fastening means are resilient snaps depending from the base portion and integral with the base portion and alignable with the support member holes, the resilient snaps being inserted into the support member holes to compressively attach the base portion to the support member by effectuating the deformation of the arched cushion means, and
(i) the side flanges are resiliently spreadable to enable the insertion of a tool into the hollow interior and against the resilient snaps for operative insertion of the snaps.

11. A bumper strip for an automobile as defined in claim 6, in which:
(g) the support member is provided with an elongate channel partially defined by lateral shoulders,
(h) the base portion of the strip is located in the channel,
(i) the converging side flanges have abutting outer ends to provide a resilient and compressible, tubular structural member,
(j) the fastening means attaches the base portion to the support member at the bottom of the channel,
(k) the strip is provided with projecting lips substantially along the side flanges and engaging the lateral shoulders, and, cooperating with the lateral shoulders, the lips tending to urge the side flanges toward and into compressive abutment with each other, and
(1) the side flanges are resiliently spreadable to gain access to the hollow interior for attaching the fastening means to the support member.

References Cited

UNITED STATES PATENTS

| | | | |
|---|---|---|---|
| 1,745,902 | 2/1930 | Merrick | 52—717 |
| 1,972,283 | 9/1934 | Zimmers | 280—163 |
| 2,161,837 | 6/1939 | Tell | 280—152 |
| 2,191,689 | 2/1940 | Tinnerman | 52—718 X |
| 2,263,063 | 11/1941 | Allen | 52—717 |
| 2,275,127 | 3/1942 | Brown | 52—718 |
| 2,612,972 | 10/1952 | Heimgartner et al. | 52—716 |
| 2,817,510 | 12/1957 | Hoban | 267—63 |
| 3,291,516 | 12/1966 | Kayas | 293—71 X |

ARTHUR L. LA POINT, *Primary Examiner.*

H. BELTRAN, *Assistant Examiner.*

U.S. Cl. X.R.

52—718; 105—285; 267—1; 280—152; 293—62, 71